United States Patent [19]

Berlinski

[11] Patent Number: 5,653,593
[45] Date of Patent: Aug. 5, 1997

[54] SPACEBALLS

[76] Inventor: James Berlinski, 10 Doviak Rd., Pine Bush, N.Y. 12566

[21] Appl. No.: 544,966

[22] Filed: Oct. 30, 1995

[51] Int. Cl.[6] ................................................. G09B 1/36
[52] U.S. Cl. .......................... 434/159; 434/171; 446/431
[58] Field of Search .................................. 434/171, 159, 434/172; 446/431, 437; 273/58 R, 128 A

[56] References Cited

U.S. PATENT DOCUMENTS

| | | | |
|---|---|---|---|
| D. 145,875 | 11/1946 | Plebanek | 273/58 R |
| 2,286,368 | 6/1942 | May | 434/159 |
| 2,723,465 | 11/1955 | Silverstein | 434/159 |
| 2,783,046 | 2/1957 | Lien | 273/58 R |
| 3,853,321 | 12/1974 | Claffie | 434/159 |
| 4,037,846 | 7/1977 | Zeeman | 273/157 R |
| 4,257,605 | 3/1981 | Bancroft | 446/437 |
| 4,802,854 | 2/1989 | Davis | 434/159 |
| 5,328,399 | 7/1994 | Reynolds | 273/58 R |
| 5,480,143 | 1/1996 | McMurry | 273/58 R |

*Primary Examiner*—Paul J. Hirsch

[57] ABSTRACT

This invention comprises an instructional and game device wherein two elements of the device may be fitted together to form a non-continuous ball which may be bounced, rolled, spun or thrown. The elements comprise, for example, the letters of the alphabet wherein a large "A" and a small "a" may be fitted together to form a discontinuous spherical ball. The letters are formed in a particular rounded format around the exterior edge and include a centrally located notched internal member where the elements are locked together. The individual elements are generally flat and may be readily stacked for packaging. Various constructions or combinations may be built with the letters. Also, the elements may be made in the shape of numerals so that various combinations of numerals or numerals and letters may be fit together into a discontinuous spherical design.

7 Claims, 4 Drawing Sheets

SPACEBALLS

BACKGROUND OF THE INVENTION

This invention relates to teaching and learning games and devices known as Spaceballs wherein the alphabet or other knowledge may be imparted to the user. The devices are particularly suited though not limited to children. Additionally, the devices may be used for amusement in a game context wherein the Spaceballs may be thrown, spun, tossed, etc. or used in various intriguing constructions.

The prior art includes many types of such games as illustrated in U.S. Pat. No. 5,092,777 which is more or less a block or card type arrangement to learn the alphabet. Another prior art patent, U.S. Pat. No. 4,037,846 discloses an alphabet cube puzzle. U.S. Pat. No. 4,188,734 discloses an educational toy wherein various letters are depicted on pegs which fit into a game board to assist the user in learning how to spell. U.S. Pat. No. 4,306,868 discloses an instructional and recreational means for developing ability in spacial relationships and numerical and alphabetical usage. Various game blocks are designed to fit into spaces onto a game board.

In addition to the foregoing, there are many other devices which fall into this general area such as U.S. Pat. Nos. 4,998,883, 4,222,181 and 4,113,256. None of the foregoing patents disclose the present invention which relates to a Spaceball wherein letters are formed in shapes having a curved outer periphery and both capital letters and the small letters fit together in any numbers of combinations to form a discontinuous ball which can be spun, thrown, tossed, etc. The present invention facilitates the learning of the alphabet and various words and numbers. The invention also has a large amusement component since, as mentioned previously, the Spaceballs may be spun, tossed, twisted, etc. either informally or as part of a game. The spaceballs formed by the letters are unique in configuration and usage. The prior art devices and games are substantially different.

SUMMARY OF THE INVENTION

This invention relates to instructional and recreational devices and games and particularly to Spaceballs combining two elements into a discontinuous spherical design for a particular instructional and recreational purpose.

A typical embodiment of the invention would comprise elements forming the capital and small letters of the alphabet. The letters all have a curved outer periphery to permit rolling or spinning, etc. The large and small letters both fit together in any number of combinations with a particular mating internal notch so that the elements are locked together. Various other learning exercises may be utilized such as fitting together capital letters or a letter and a numeral or symbol.

This invention provides a new and improved game device wherein the letters of the alphabet or numerals are combined to form a Spaceball. This would provide a learning experience for children who could then use the ball for play, i.e., tossing, rolling, spinning, etc.

The letters can also be used to spell various words or to form miscellaneous constructions for recreational purposes. In addition, initials could be combined to form a unique configuration or various symbols such as animals may be combined. Since the letters are substantially flat, they may be readily packaged for shipment. As a further advantage, the letters or elements are relatively inexpensive and may be molded from plastic which is particularly suitable for force fitting elements together.

Accordingly, it is an object of this invention to provide a new and improved instructional and game device.

A further object of this invention is to provide a new and improved game device which involves alphabet letters which may be formed into Spaceballs.

A still further object of this invention is to provide a new and improved gaming device which includes elements such as letters of the alphabet or numerals which may be coupled together to form Spaceballs which have rounded exteriors for spinning, tossing, etc.

A more specific object of this invention is to provide a new and improved learning and gaming device which includes small and large letters of the alphabet or numerals having rounded exterior surfaces which may be fitted together with an internal coupling to form a Spaceball which can be tossed, spun or otherwise used in a game.

DETAILED DESCRIPTION OF THE DRAWINGS

The above and other objects and advantages of the invention may be more clearly seen when used in conjunction with the accompanying drawings wherein:

FIG. 1 depicts a gaming and instructional device showing the alphabet letters which can be combined together to form a Spaceball from the letter A;

FIG. 2 discloses the elements Spaceball which is formed by the combination of small and large letters of the letter A in the alphabet;

FIG. 3 discloses capital letters which can be used to form Spaceballs or spell various words;

FIG. 4 discloses the capital letters of the alphabet which have been mounted together to form Spaceballs;

FIG. 5 discloses various numerals and mathematical symbols which can be mounted together to form Spaceballs;

DETAILED DESCRIPTION OF THE INVENTION

Figure 1:
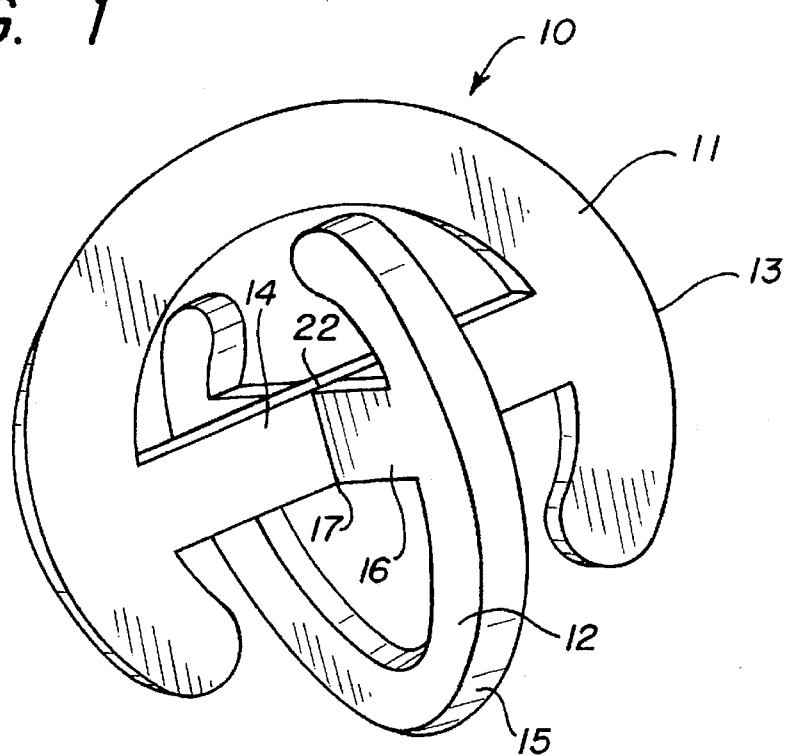

Referring now to the drawings, the invention comprises a plurality of elements 11, 12 which may be combined to form Spaceballs 10. The term Spaceballs is descriptive of the fact that the elements 11, 12 are combined with curved outer peripheries 13, 15 forming a discontinuous ball or sphere with space therebetween.

Figure 2:
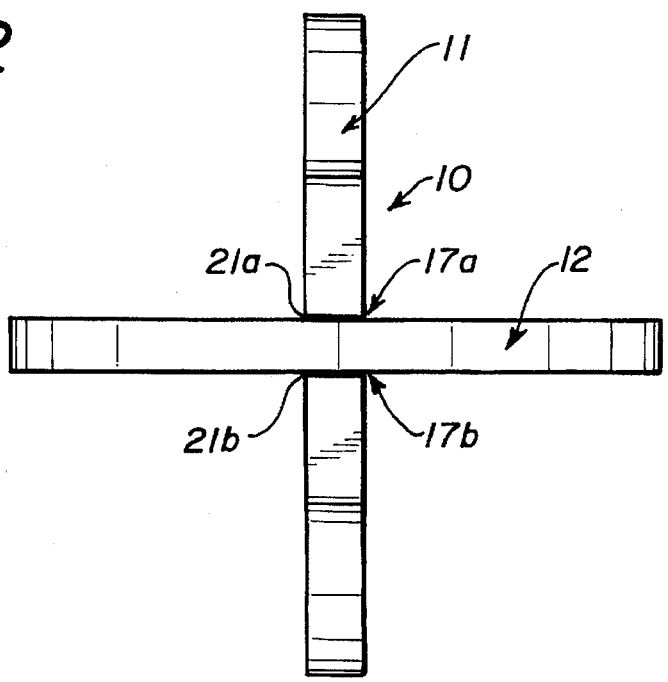

In FIGS. 1 and 2, the combination of two elements 11, 12 forming a the letter "A" is disclosed. The larger capital "A" is shown at 11 and the second captial letter "A" is shown at 12 affixed to the center bar 14 on the capital letter 11. The center bar 16 on the second letter "A" engages a notch 17 on cross bar 14 of the capital letter 11 so that the two letters 11 and 12 are mounted together. The mating letter 12 with its mating notch 17a may be force-fit into the expandable notch 17b of the plastic letter 11. Alternatively the notch 17a or 17b may engage a solid member. The capital "A" is structured so that its outer periphery 13 is rounded and the second letter "a" is similarly constructed with its outer periphery 15 rounded. This forms a Spaceball which may be spun, tossed, twisted, etc. in a formal or informal game arrangement.

Figure 3:
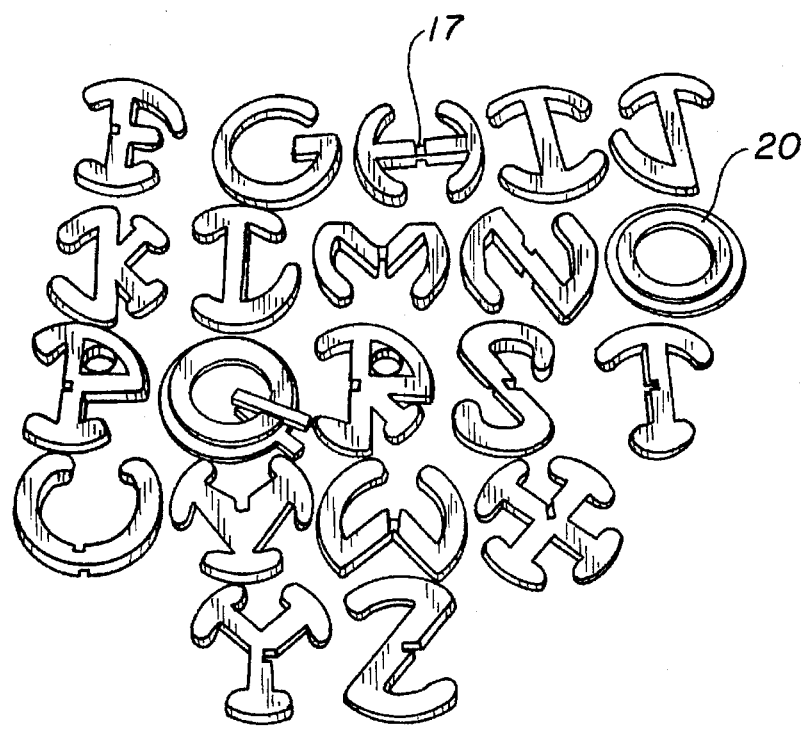
Figure 4:
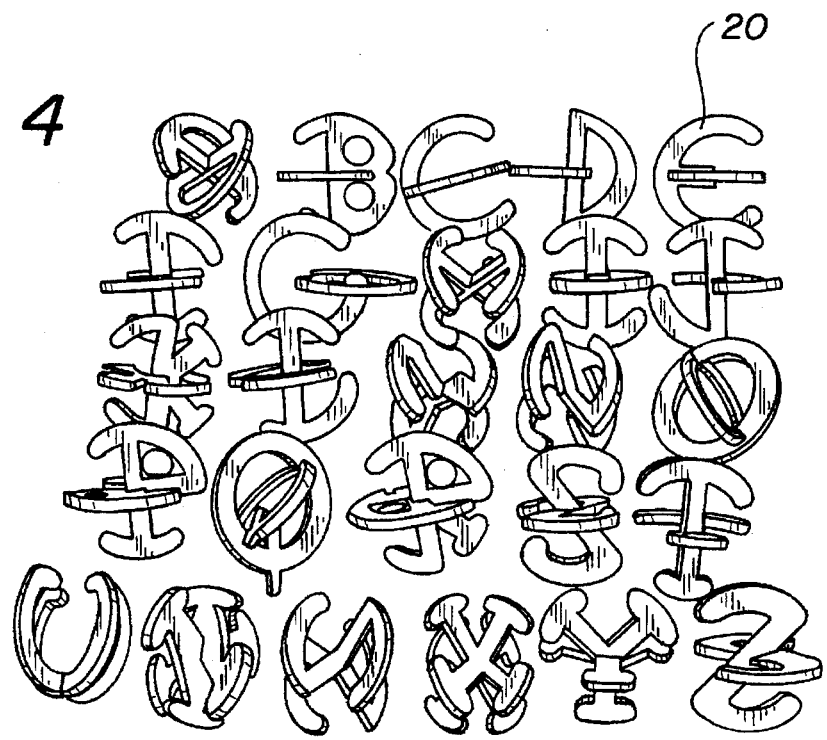
Figures 7, 8:
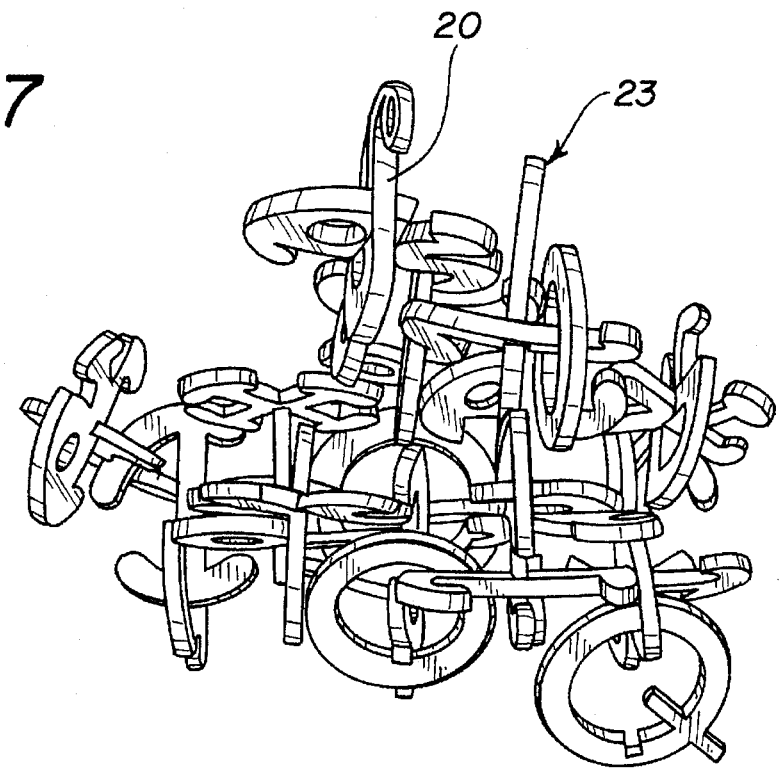
FIG. 7 depicts a construction formed by various Spaceball elements.
FIG. 8 depicts various words spelled with the letter elements.

In FIG. 3, the various configurations of the capital letters 20 are shown with a central internal notch 17 for engagement with a mating letter. The notch 17 comprises parallel side walls 21a, 21b of a predetermined depth which terminate on a base 22 which is perpendicular thereto. The mating portion of another element is force fitted into the notch 17. FIG. 4 discloses a combination of the various alphabet letters 20 into Spaceballs 10 while it is, of course, understood that the letters used independently can be used to spell various words as shown in FIG. 8. Thus, the Spaceballs can be utilized for letter recognition and for spelling purposes. The Spaceballs 10 formed by combining the letters are unique in configuration and can be employed in various game formats.

Figure 5:
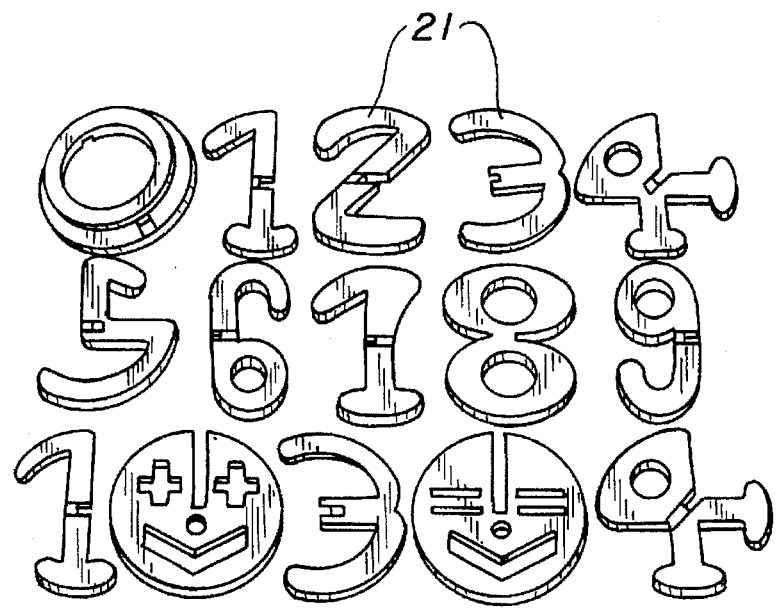
Figure 6:
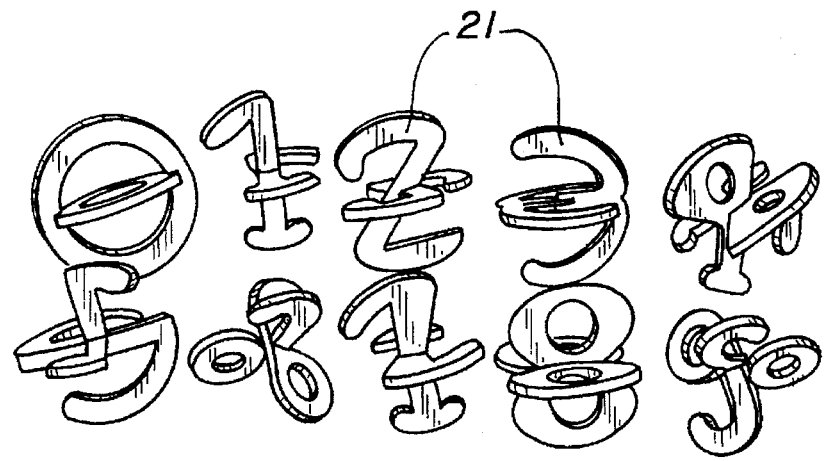
FIG. 6 illustrates Spaceballs formed by combining two of the same numerals together to form Spaceballs.

The Spaceballs 20 can also be formed of numerals 21 as shown in FIG. 5. The numbers zero through nine and various mathematical symbols are depicted. The numerals 21 can be combined into Spaceballs 20 in various formats as shown in FIG. 6 or they can be used merely as flat numerals for purposes of teaching arithmetic.

Another possibility for recreational purposes is to combine letters 11, 12 to form initials in a unique configuration or to form various constructions 23 with the letters. The constructions can be quite attractive and unusual due to the shape of the letters employed. FIG. 7 depicts one such configuration. Children are intrigued by the possibility of building large constructions 23 of an unusual nature with the elements 20 and 21.

The Spaceball elements 11, 12 may be formed of plastic which is light and inexpensive. The use of plastic also facilitates the force-fit of elements 11, 12 together. The Spaceball elements 11, 12 may be stacked for ease of storage and shipment. The various adaptations to the letters are insignificant and are not deemed to affect letter recognition but are necessary in order to provide the rounded periphery 13, 15 needed to form a spaceball 20. the formed Spaceballs 20 may be rolled, spun or thrown in various game formats.

While the invention has been explained by a detailed description of certain specific embodiments, it is understood that various modifications and substitutions can be made in any of them within the scope of the appended claims which are intended also to include equivalents of such embodiments.

What is claimed is:

1. A spaceball game apparatus comprising;
    a first member from a set of alphabetical, numerical and mathematical symbols, each of said symbols having an expandable notch and being formed substantially in the shape of an alphabetical or numerical character, or having a mathematical symbol associated therewith,
    said first member including a curved outer periphery and an internal portion having an expandable notch, and at least a second member of said symbols also including a curved outer periphery and an internal portion having an expandable notch,
    said notch of said first member being engageable with the notch of said second member to form a spaceball having a discontinuous outer periphery which functions as a game device,
    wherein said symbols may further be used to spell words and/or teach arithmetic.

2. A spaceball game device in accordance with claim 1 wherein:
    each letter of the alphabet forms a stylized member having a curved outer periphery forming the outer surface of a discontinuous sphere in conjunction with a second stylized alphabet letter coupled thereto and having a curved outer periphery.

3. A spaceball game device in accordance with claim 2 wherein:
    the stylized members each comprise a flat upper surface and a flat bottom surface parallel thereto and downwardly extending parallel sides joining said surfaces to permit ease of stacking and the spaceball configuration is asymmetrical.

4. A spaceball game device in accordance with claim 1 wherein:
    the first and second members are of unequal non-symmetrical shape.

5. A spaceball game device in accordance with claim 2 wherein:
    a plurality of alphabet members and numeral members are connected to form predetermined designs.

6. A spaceball game device in accordance with claim 1 wherein:
    the first member is a letter and the second member is a number.

7. A spaceball game device in accordance with claim 1 wherein:
    the device comprises a resilient material; and,
    the internal notched portions are coupled at right angels, said notched portions each expanding to grip the opposing member and said notch terminating a predetermined distance into the internal portion.

* * * * *